(12) United States Patent
Siu

(10) Patent No.: US 7,263,292 B1
(45) Date of Patent: Aug. 28, 2007

(54) METHODS AND APPARATUS FOR CONTROLLING MULTIPLE INFRARED DEVICES

(75) Inventor: Donald Siu, Santa Ana, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 614 days.

(21) Appl. No.: 10/714,774

(22) Filed: Nov. 17, 2003

(51) Int. Cl.
*H04B 10/00* (2006.01)

(52) U.S. Cl. .................. 398/106; 398/111; 398/112; 398/114; 398/118; 398/116; 398/126; 398/127; 398/135; 398/173; 398/171; 398/175; 340/825.22; 340/825.69; 340/825.72; 340/825.75; 455/99; 455/103; 455/345; 455/351; 370/341; 370/350; 341/174; 341/176; 307/116

(58) Field of Classification Search .............. 398/112, 398/118, 106, 111, 126, 135, 171, 114, 116, 398/127, 173, 175; 307/116; 455/99, 103, 455/345, 351; 370/341, 350; 700/253; 340/825.75, 340/825.69, 825.22, 825.72; 341/174, 176
See application file for complete search history.

(56) References Cited

U.S. PATENT DOCUMENTS

| | | | |
|---|---|---|---|
| 4,079,414 A | 3/1978 | Sullivan | |
| 5,227,780 A * | 7/1993 | Tigwell | 340/825.72 |
| 5,355,162 A | 10/1994 | Yazolino et al. | |
| 5,715,020 A | 2/1998 | Kuroiwa et al. | |
| 5,969,714 A | 10/1999 | Butcher | |
| 6,128,467 A | 10/2000 | Rege | |
| 6,480,762 B1 * | 11/2002 | Uchikubo et al. | 700/253 |
| 2002/0186676 A1 * | 12/2002 | Milley et al. | 370/341 |
| 2003/0083024 A1 * | 5/2003 | Richenstein et al. | 455/99 |
| 2003/0094856 A1 * | 5/2003 | Face et al. | 307/116 |

* cited by examiner

*Primary Examiner*—Hanh Phan
(74) *Attorney, Agent, or Firm*—Georgann S. Grunebach

(57) ABSTRACT

A method and apparatus for controlling a plurality of infrared devices (ICDs) is provided herein. A remote controller is used to generate an optical signal for controlling a plurality of ICDs. The optical signal generated by the remote controller is converted into an electrical signal by an infrared repeater device. An implementation of such a system includes a rotary mechanical switch to direct the electrical signal generated by the infrared repeater device to a light emitting diode (LED) located near one of the plurality of ICDs. The LED converts the electrical signal into an optical signal and re-transmits the optical signal to the one of the plurality of ICDs. The system allows controlling the plurality of ICDs located in a remote location without having the user commute closer to such ICDs.

20 Claims, 3 Drawing Sheets

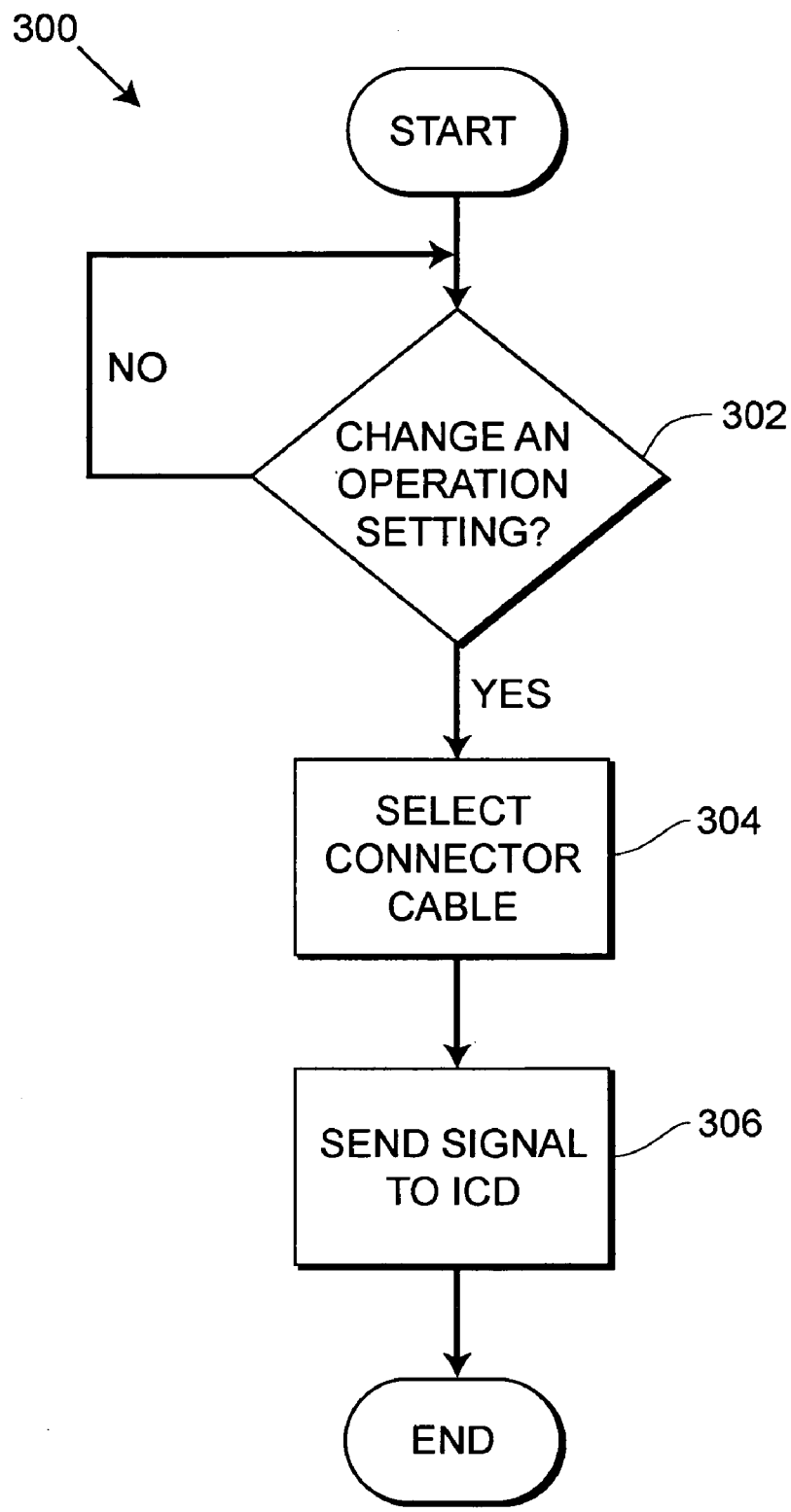

METHODS AND APPARATUS FOR CONTROLLING MULTIPLE INFRARED DEVICES

TECHNICAL FIELD

This patent relates generally to controllers for infrared devices, and more particularly, to a controller for selecting between two or more infrared devices from a centralized location.

BACKGROUND

Broadcasting stations used for broadcasting pay-per-view television channels via satellites or via microwave transmission networks typically transmit multiple programs on multiple channels. Generally, such broadcasting stations are managed from a central control facility that receives a number of programs from a number of different sources. For example, one of the number of programs received at the central control facility of a broadcasting station may be a live feed from a sports event, a live feed from a scene of a crime, etc. Subsequently the personnel at the central control facility are responsible for selecting which of such programs to receive and to repackage for re-transmittal.

Typically, within the central control facility of a broadcasting station, each of the multiple sources can be received on one of a number of program receivers by tuning a program receiver to a given frequency. For proper reception of an incoming program, various other parameters of such program receivers, such as the noise level adjustment, bandwidth, gain parameters, etc., may need to be changed as well.

The program receivers are generally stacked in racks so that a large number of program receivers can be stored in an equipment area. The program receivers may be controlled by directly-cabled means such as RS-232, RS-422 or Ethernet. Alternatively, when program receivers do not have serial, networked or other addressable control capabilities, they may be controlled by consumer grade equipment, such as, infrared remote controllers. Even though these program receivers can be controlled manually or via one or more controllers connected to them, generally these receivers are controlled remotely via infrared controllers. Typically, all program receivers within a given control facility are of the same brand and model such that the settings for all of the program receivers can be changed using a single infrared controller. Controlling program receivers using infrared controllers allows one to avoid having to physically reach a program receiver unit which may be accessible only via stairs or by moving one or more racks. Also, using infra-red controllers allows the personnel in the control facility to change the operation of such receivers without having to hard-wire communication connections to the program receivers. To recognize the commands transmitted by the infrared controller, each of the program receivers to be controlled contains an infrared controlled device (ICD) mounted on its panel. Such an ICD typically includes an infrared detection module that converts the received infrared signal to an electrical signal and that provides the electrical signal to a circuit that controls the program receiver. Consequently, a central control facility that contains a number of program receivers will also have a number of ICDs.

Using an infrared controller with a cluster of ICDs located close to each other on racks causes at least two distinct problems. First, central control facilities typically have a separate equipment room that contains one or more racks with a number of program receivers, each having an ICD, whereas a broadcast operator controlling such ICDs generally works from a broadcast room separate from the equipment room. Because of this arrangement, every time a broadcast operator needs to make a change to the operation of a program receiver, the broadcast operator must walk away from the broadcast room to the equipment room. This is a very inefficient method of controlling the operation of program receivers.

Secondly, because a number of program receivers are typically placed in racks close together, if a broadcast operator attempts to change a setting of a particular program receiver using an infrared controller, the control signal transmitted from the infrared controller may be received by ICDs located on other program receivers in the rack close to the intended program receiver. This may cause the settings of such a nearby program receiver to be changed unintentionally. To avoid changing a setting of program receivers other than an intended program receiver, a broadcast operator must get very close to the ICD located on a program receiver so that an infrared beam emitted from the infrared controller is not received by any other ICD located on another program receiver. It is not always possible to get in close proximity to an ICD located on a program receiver, for example, when a program receiver is stacked high on a rack. Even if it is possible to get physically close to an ICD, the need to do so defeats the purpose of using ICDs. Alternatively the broadcast operator must narrow the infrared emission angle so that only one ICD receives the signal transmitted by the remote controller.

BRIEF DESCRIPTION OF THE DRAWINGS

The present patent is illustrated by way of examples and not limitations in the accompanying figures, in which like references indicate similar elements, and in which:

FIG. 3 illustrates a flowchart of a method used for remotely controlling multiple infrared controlled devices.

DETAILED DESCRIPTION OF THE EXAMPLES

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

A system for controlling a number of infrared controlled devices (ICDs) used in a broadcasting station having a number of ICDs each equipped with an infrared detector is disclosed. An infrared emitter, such as a light emitting diode (LED), is located near each of the ICDs such that a signal transmitted by an LED is captured by one and only one infrared detector. The electrical signal input to the LEDs is generated by a rotary switch or a demultiplexer, where the rotary switch or the demultiplexer is controlled by a remote control device or a computer.

Figure 1:
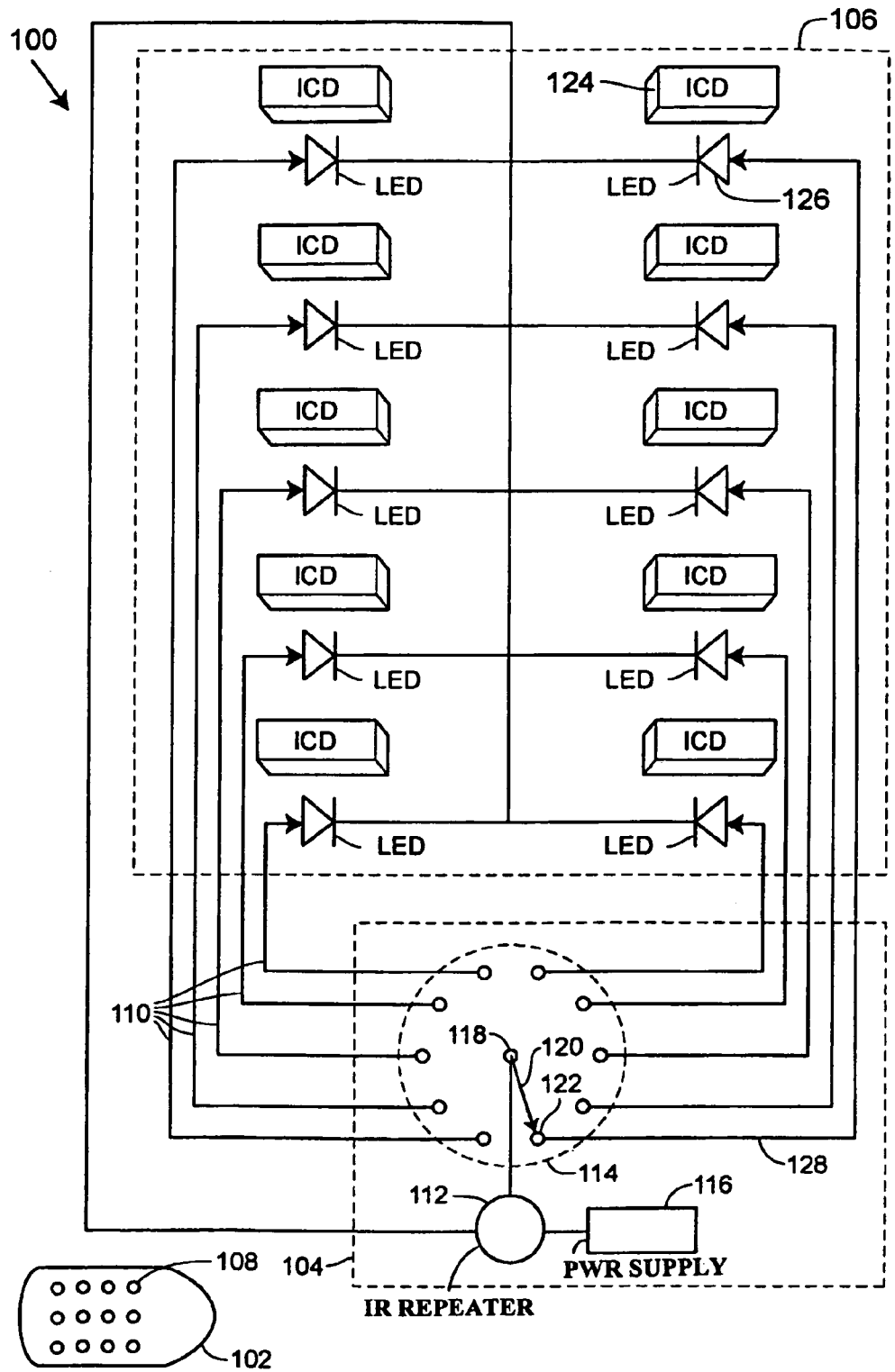
FIG. 1 illustrates a system for remotely controlling multiple infrared controlled devices.

FIG. 1 illustrates a simplified diagram of a system 100 for controlling a plurality of ICDs that may be used in a central control facility of a broadcasting station. In the example illustrated in FIG. 1, the system 100 includes a remote controller 102, a connector selection module 104 and a plurality of ICDs 106.

The remote controller 102 may be any of the standard remote controllers available off the shelf, similar to ones used for controlling a TV, a video cassette recorder (VCR), etc. The remote controller 102 used in a central control facility of a broadcasting station may be provided by a manufacturer of program receivers used by the broadcasting station. Remote controllers available in the market use a number of different optical signals to transmit control information, with infrared being the most commonly used mode of transmitting such information. Therefore, the explanation of the system 100 described herein will refer to infrared signals only. However, in practice, other types of optical signals may be used as well. An example of the remote controller 102 may be Hughes HNS-R replacement infrared remote controller that is used to control satellite TV and DirectTV® related accessories.

The remote controller 102 generally has a number of alpha, numeric, and other control buttons 108 that allow a user to select a combination of numbers, a specific command, etc. For example, one such button may be used to switch an operating frequency of a program receiver used by the central control facility. In another example, a user may press a specific combination of numeric buttons to select a specific frequency for a program receiver. Subsequently, the remote controller 102 may transmit an optical signal corresponding to the numeric selection in a direction in which the remote controller 102 is pointed. In the exemplary system of FIG. 1, the remote controller 102 is pointed towards the cable connector selection module 104, which results in an optical signal from the remote controller 102 being transmitted towards the cable connector selection module 104.

The cable connector selection module 104 shown in FIG. 1 allows a user to select one of a plurality of connectors 110 to convey a signal emitted by the remote controller 102 to one of the plurality of ICDs 106. The exemplary cable connector selection module 104 includes an infrared repeater 112 connected to an input port of a mechanical rotary switch 114 and a power supply 116. The infrared repeater 112, which may be, for example, a Xantech model 490-200 IR repeater, is designed to receive infrared signals from the remote controller 102 and to convert them into electrical signals. For each infrared signal received from the remote controller 102, the infrared repeater 112 outputs a unique electrical signal.

The exemplary mechanical rotary switch 114 of FIG. 1 comprises an input port 118, a rotary arm 120, and a number of output ports 122. The input port 118 receives an electrical input signal from the infrared repeater 112 and a user can rotate the rotary arm 120 to electrically connect the input port 118 to any of the output ports 122, which are connected to the plurality of conductor cables 110. For example, when the rotary arm 120 is located in the position shown in FIG. 1, the input port 118 is electrically connected to a fifth output port 122. In this case an electrical signal generated by the infrared repeater 112 will be transmitted from the input port 118 to the fifth output port 122 and then to the connector connected to the fifth output port 122. As it will be clear to one of ordinary skill in the art, an alternate type of switch can also be used. For example, a sliding bar switch can be used in place of the mechanical rotary switch 114.

The power supply 116 provides the necessary power that will be transmitted from the infrared repeater 112 to one of the plurality of connectors 110 as determined by the switch 114.

Each of the plurality of ICDs 106 of FIG. 1 is located on a program receiver used by the central control facility and has an infrared emitter located nearby. While a number of different types of infrared emitters can be used, in the exemplary illustration of FIG. 1, each of the infrared emitters located near the plurality of ICDs 106 is a light emitting diode (LED). For example, in FIG. 1, LED 126 is located near an ICD 124. As further shown in FIG. 1, the cathodes of each of the plurality of LEDs 126 are connected together and are connected to the cathode of the infrared detector 112. The anodes of each of the plurality of LED 126 are connected to one of a plurality of the outputs of the rotary switch 114. For example, the LED 126 is connected to a connector-5 128 and to the output port 122.

When an electrical current passes through an LED, the LED emits an infrared signal which is captured by an ICD located near the LED. In other words, the LEDs shown in FIG. 1 are optically coupled to the associated ICDs. For example, the ICD 124 may be optically coupled to the LED 126 by either mounting the LED 126 on a light detector port of the ICD 124, or by locating the LED 126 in a close proximity to the light detector port of the ICD 124 in such a way that a light signal emitted by the LED 126 will be captured by only the ICD 124 and by no other ICD from the plurality of ICDs 106. Such a close coupling of an LED with an ICD ensures that one and only one ICD receives an optical signal emitted by any particular LED. A user can then transmit information to an ICD by passing an electrical current through an LED located near such an ICD.

In one example of the system 100, the ICD 124 may control a program receiver that receives a TV program from a satellite network. This may be the case, for example, in a broadcast control center that receives a number of TV programs from a satellite networks and that retransmits the TV programs on a cable network. A user interested in controlling the program received on the program receiver associated with the ICD 124 may set the rotary arm 120 of the rotary switch 106 to the position shown in FIG. 1, such that the LED 126 is electrically connected through the connector 128 to the infrared repeater 112. In this situation, a signal transmitted on the connector 128 will power the LED 126 to generate an infrared signal that will be transmitted to the ICD 124.

For example, if the user selects to change an operating frequency of a receiver that is associated with the ICD 124 from a first frequency to a second frequency, the user may select the appropriate button 108 on the remote controller 102 specifying the new frequency and include a command to change an operating frequency to a new frequency. The resultant infrared signal generated by the remote controller 102 will be transmitted to the infrared detector 112 and converted into an electrical signal. Such an electrical signal will be transmitted by the rotary switch 114 to the connector 128 and subsequently to the LED 126. Upon receiving such an input signal, the LED 126 will generate and transmit an infrared signal to the ICD 124 instructing the ICD 124 to change an operating frequency of a program receiver associated with the ICD5.

It can be easily understood that the system 100 for controlling a plurality of ICDs can also be used in a number of other applications where the plurality of ICDs 106 may be controlling devices other than program receivers. For example, the system 100 can be used in a security surveillance system in a building where the devices controlled by the plurality of ICDs 106 may be a number of surveillance cameras located in various parts of the building. In such an implementation, a user in a security control room may want to use the remote controller 102 to change an angle or focus of a particular surveillance camera. In yet another example, the system 100 can be used in a closed circuit television (CCTV) system where a user at a central location may want to use the remote controller 102 to control a volume or a brightness of a particular TV set used in the CCTV.

In an implementation of the system 100 for controlling a plurality of ICDs used in a broadcast control center, a plurality of receivers associated with the plurality of ICDs 106 may be stacked on one or more racks where such racks are located in an equipment room, whereas the remote controller 102 and the connector selection module 104 can be located in a control room where a broadcast operator is located. In such an implementation of the system 100, the broadcast operator can control the plurality of receivers associated with the plurality of ICDs 106 without having to physically go to the equipment room.

Figure 2:
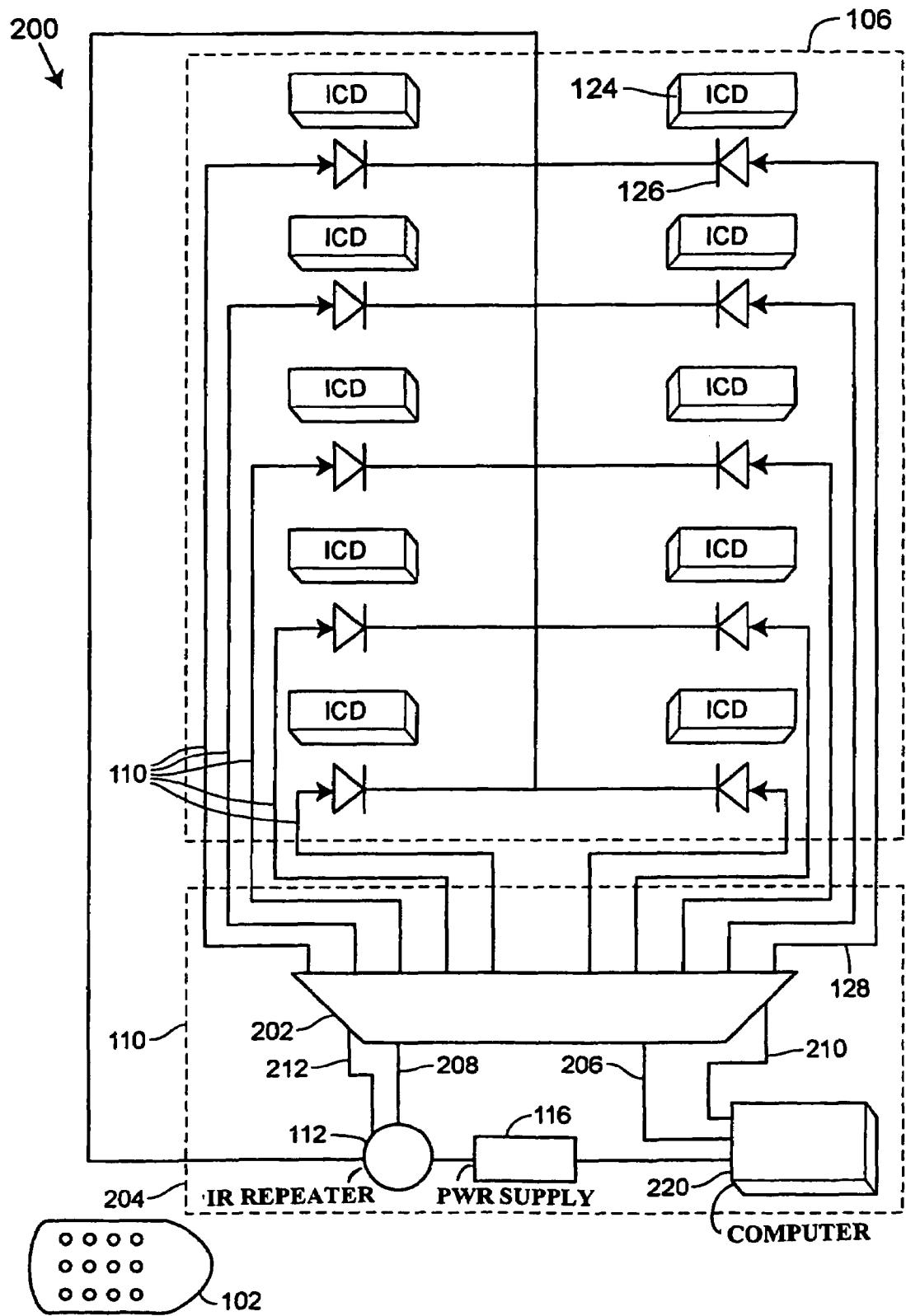
FIG. 2 illustrates an alternate system for remotely controlling multiple infrared controlled devices.

FIG. 2 illustrates an alternate implementation of a system 200 for controlling a number of infra-red devices. The system 200 of FIG. 2 is similar to the embodiment illustrated in FIG. 1 and includes many of the same structures and components which are illustrated with like reference numbers as those of FIG. 1. Whereas the system 100 shown in FIG. 1 uses a rotary switch 114 to implement the connector selection module 104, the system 200 shown in FIG. 2 uses a demultiplexer 202 to implement a connector selection module 204. In general, a demultiplexer selects an output line from a number of output lines to carry an input signal based on a control signal received by the demultiplexer and communicates the input signal received on the input line to the selected output line. A number of off-the-shelf integrated circuits can be used as a demultiplexer. Alternatively, a demultiplexer can also be implemented using a combination of firmware and software.

FIG. 2 illustrates a few different implementations of the connector selection module 204 using the demultiplexer 202. In the example illustrated in FIG. 2, the demultiplexer 202 receives an input on one of the two lines 206 and 208. Such an input is demultiplexed on one of the plurality of connectors 110 and is then transmitted to one of the plurality of ICDs 106. The demultiplexer 202 also receives a control signal on a line 210 or on a line 212 that determines which of the plurality of the connectors 110 will carry the input signal received by the demultiplexer 202 to the plurality of ICDs 106.

In one implementation of the connector selection module 204, the remote controller 102 sends an optical signal for controlling one of the plurality of ICDs 106. The infrared repeater 112 converts the optical signal transmitted by the remote controller 102 into an electrical signal and inputs the electric signal into the demultiplexer 202 on the line 208. A computer 220 generates a line control signal that determines which of the connectors from the plurality of connectors 110 will carry the electrical signal on the line 208 to the plurality of ICDs 106. Subsequently, the computer 220 transmits such a line control signal via the line 210 to the demultiplexer 202. A keyboard or any other input device connected to the computer 220 can be used to generate the line control signal input on the line 210. Such an implementation of connector selection module 204 allows a user in a central control office to manage control signals transmitted to a plurality of ICDs 106. The power supply 116 is used to provide a power input to the infrared detector 112 and to the computer 220. The power supply 116 may also be used to provide power to the demultiplexer 202.

Alternatively, the connector selection module 204 can be implemented such that the remote controller 102 also generates the line control signal to select which of the plurality of connectors 110 carries a signal to the plurality of ICDs 106. In such an implementation, the remote controller 102 transmits an optical line control signal to the infrared repeater 112, which converts such an optical line control signal to an electrical line control signal and outputs the electrical line control signal on the line 212. Subsequently, the remote controller 102 generates an optical signal which is converted and transmitted on the line 208 and which is then sent to one of the plurality of ICDs 106.

In yet another implementation of the connector selection module 204, the computer 220 generates a signal on the line 206 and the demultiplexer 202 transmits such a signal to one of the plurality of ICDs 106, where the demultiplexer 202 selects a connector carrying such a signal using a line control signal input to the demultiplexer 202 either on the line 210 or on the line 212.

An alternate implementation of the connector selection module 204 can permit operation between locations separated by large distances. For example, commands from the connector selection module 104 may be sent to the plurality of ICDs 106 over the Internet.

FIG. 3 is an exemplary flowchart of a method 300 used for remotely controlling the plurality of ICDs 106 by using either of the system 100 illustrated in FIG. 1 or the system 200 illustrated in FIG. 2. At a step 302 a user determines whether an operational setting of any of the program receivers attached to the plurality of ICDs 106 needs to be adjusted. If such an adjustment is necessary, at a step 304 a user selects one of the ICDs from the plurality of ICDs 106 and a connector from the plurality of the connectors 110 carries a signal to such a selected ICD. A user can set the mechanical rotary switch 114 of FIG. 1 or select an appropriate line control signal on either one of the lines 210 and 212 of the demultiplexer 202 of FIG. 2 to select one of the plurality of connectors 110. At a step 306 a user transmits a signal on the connector selected at the step 304. A user can generate the signal to be transmitted to the plurality of ICDs 106 by either using the remote controller 102, as illustrated in FIG. 1 and FIG. 2 above, or by using the computer 220 as illustrated in FIG. 2 above.

Many modifications and variations may be made in the techniques and structures described and illustrated herein without departing from the spirit and scope of the present invention. Accordingly, it should be understood that the methods and apparatus described herein are illustrative only and are not limiting upon the scope of the present patent.

What is claimed is:

1. A system for transmitting signals from a remote controller to a plurality of optically controlled devices, wherein each of the optically controlled devices respond in a similar fashion to a given optical input signal, comprising:
- a repeater device adapted to receive the given optical input signal from the remote controller and to generate an electrical output signal;
- a switching device that selectively connects the repeater device to a connector; and
- a plurality of light emitting devices, connected to the connector in a respective fashion, for generating and transmitting an optical output signal to the optically controlled device in response to the electrical output signal received from the repeater device, such that a only a subset of the plurality of optically controlled devices receive the optical output signal based on a position of the switching device.

2. The system of claim 1, wherein the optical input signal is an infra-red signal.

3. The system of claim 1, wherein the switching device is a mechanical rotary switch.

4. The system of claim 1, wherein the switching device is a demultiplexer.

5. The system of claim 4, further comprising a computer adapted to provide a control input signal to the demultiplexer to select the connector carrying the electrical output signal.

6. The system of claim 1, further comprising a receiver control circuit located on a program receiver and adapted to control an operational setting of the program receiver in response to the optical output signal.

7. The system of claim 6, wherein the system is used in a broadcast control center for controlling one or more program receivers.

8. The system of claim 7, wherein the remote controller and the optically controlled device are located in separate locations.

9. A system for controlling multiple optically controlled devices comprising:
- a repeater device configured to receive an optical input signal and convert the optical input signal into an electrical output signal;
- a switching device adapted to output the electrical output signal to one of a plurality of conductors;
- a plurality of infrared emitting devices connected to the plurality of conductors in a respective fashion and configured to generate an optical output signal in response to the electrical output signal; and
- a plurality of infrared responsive devices in optical communication with the plurality of infrared emitting devices, wherein each of the plurality of infrared responsive devices responds similarly to the optical output signal, and only a subset of the plurality of infrared responsive devices receives the optical output signal based on a position of the switching device.

10. The system of claim 9, wherein the switching device is a multi-position, mechanical rotary switch.

11. The system of claim 9, wherein the switching device is a demultiplexer.

12. A system of claim 9, wherein the plurality of infrared responsive devices are connected to a plurality of receiver controller devices where each of the plurality of receiver controller devices is adapted to control an operational setting of a program receivers.

13. A system of claim 12, wherein the plurality of program receivers are adapted for use in a broadcast control center to receive programs to be re-transmitted on one of a television network and a cable network.

14. A system of claim 9, wherein the plurality of infrared responsive devices are connected to a plurality of cameras in a security surveillance network.

15. A method of selectively transmitting an optical input signal from a remote controller to a plurality of light emitting devices comprising:
- transmitting the optical input signal from the remote controller;
- receiving the optical input signal at a repeater;
- converting the optical input signal into an electrical output signal;
- selecting one of a plurality of conductors; and
- transmitting the electrical output signal by the selected conductor to one of the plurality of light emitting devices, wherein the light emitting device is selected by the selection of one of the plurality of conductors.

16. A method of claim 15, wherein the optical input signal is an infra-red signal.

17. A method of claim 15 further comprising:
- converting the electrical output signal to an optical output signal;
- transmitting the optical output signal to an optically controlled device; and
- controlling an operational setting of a program receiver in response to the optical output signal received by the optically controlled device.

18. A method of claim 17, wherein selecting one of a plurality of conductors comprises changing the setting of a mechanical rotary switch.

19. A method of claim 17, wherein selecting one of the plurality of conductors comprises changing a control input signal of a demultiplexer.

20. A method of claim 19, wherein changing the control input signal of the demultiplexer comprises generating the control input signal in a computer and transmitting the control input signal from the computer to the demultiplexer.

* * * * *